(12) United States Patent
Lee

(10) Patent No.: US 12,443,149 B2
(45) Date of Patent: Oct. 14, 2025

(54) WATCH-TYPE TERMINAL WITH OPTICAL SENSOR EQUIPPED ON SIDE PART

(71) Applicant: KOREA UNIVERSITY RESEARCH AND BUSINESS FOUNDATION, Seoul (KR)

(72) Inventor: Heon Jeong Lee, Seoul (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 338 days.

(21) Appl. No.: 18/028,896

(22) PCT Filed: Sep. 1, 2021

(86) PCT No.: PCT/KR2021/011733
§ 371 (c)(1),
(2) Date: Mar. 28, 2023

(87) PCT Pub. No.: WO2022/071669
PCT Pub. Date: Apr. 7, 2022

(65) Prior Publication Data
US 2023/0333516 A1    Oct. 19, 2023

(30) Foreign Application Priority Data
Sep. 29, 2020 (KR) .................. 10-2020-0127043

(51) Int. Cl.
*G04G 21/02* (2010.01)
*G02B 27/00* (2006.01)
*G04G 17/04* (2006.01)

(52) U.S. Cl.
CPC ............. *G04G 21/02* (2013.01); *G04G 17/04* (2013.01); *G02B 27/0093* (2013.01)

(58) Field of Classification Search
CPC ...... G04G 21/02; G04G 17/04; G04G 21/025; G02B 27/0093; A61B 5/00; A61B 5/4857;
(Continued)

(56) References Cited

U.S. PATENT DOCUMENTS 11,360,440 B2 * 6/2022 Perkins .................. G04C 3/004
11,561,515 B2 * 1/2023 Beyhs .................... G04C 3/002
(Continued)

FOREIGN PATENT DOCUMENTS

CN    105955479 B    11/2019
CN    107003642 B    12/2019
(Continued)

*Primary Examiner* — Edwin A. Leon
(74) *Attorney, Agent, or Firm* — Bridgeway IP Law Group, PLLC; Jihun Kim

(57) ABSTRACT

A wearable device with an optical sensor equipped on a side part thereof is described. The wearable device includes a body part, a strap unit which fixes the body part to a wrist part of a user, an optical sensor unit including an optical sensor installed on a side surface of the body part to acquire illuminance information, a determining unit to determine whether the wearable device is worn such that the side surface on which the optical sensor is disposed is directed to fingers of the user, a display unit which is provided on the body part to display predetermined information, and a control unit to control an output direction of the predetermined information through the display unit based on an orientation of the side surface of the body part with respect to the fingers of the user.

6 Claims, 7 Drawing Sheets

(58) Field of Classification Search
CPC ..... A61B 5/681; A61B 5/684; G06F 1/16; G06F 1/163; G06F 1/1684
See application file for complete search history.

(56) References Cited

U.S. PATENT DOCUMENTS

| | | | |
|---|---|---|---|
| 11,644,800 B2 * | 5/2023 | Holenarsipur | G04G 21/08 368/69 |
| 2020/0033815 A1 | 1/2020 | Bushnell et al. | |

FOREIGN PATENT DOCUMENTS

| | | | |
|---|---|---|---|
| JP | 2019-074972 A | 5/2019 | |
| KR | 10-2015-0079659 A | 7/2015 | |
| KR | 10-2017-0024240 A | 3/2017 | |

* cited by examiner

WATCH-TYPE TERMINAL WITH OPTICAL SENSOR EQUIPPED ON SIDE PART

TECHNICAL FIELD

The present disclosure relates to a watch-type terminal with an optical sensor equipped on a side part.

BACKGROUND ART

Recently, the concept of smart healthcare is emerging as the paradigm of medical service changes from treatment and hospital-centered service to prevention and consumer-centered service. In accordance with this, services that can receive health care anytime and anywhere by utilizing various advanced information and communication technologies such as artificial intelligence, the Internet of Things, wearable devices, smart phones, and cloud computing are being released.

In particular, smart phones equipped with various sensors are becoming increasingly widespread, and the proliferation of wearable devices that can continuously monitor activity levels, vital signs, and the like is accelerating. In this regard, a watch-type terminal (smart watch), which is a representative wearable device, is mainly equipped with a sensor that can directly measure health conditions, such as heart rate, heart rate variability, body fat, and body temperature of the wearer's body.

In the meantime, it has been widely known that disturbance of circadian biorhythm is associated with various health problems, such as sleep disorder, depression, bipolar disorder, cardiovascular disease, diabetes, obesity, and cancer and furthermore, it has been revealed that excessive stress and mental health problems of modern people are significantly related to disturbances in life patterns such as circadian biorhythms.

In particular, in order to closely manage the user's circadian biorhythm, data related to the user's light exposure, such as information about the time of day when the user is exposed to light, the degree of light exposure, the brightness of light, and the wavelength of light, needs to be precisely collected. However, there are very few smart watch products released with an optical sensor to acquire light exposure information, which is lifelog data highly related to the wearer's life pattern. Further, in fact, even though a device is equipped with the optical sensor, the optical sensor is mainly located in a center area of a body part or below a display so that there is a problem in that it is difficult to smoothly measure the light using the optical sensor in a situation in which the user wears long-sleeved clothes, and the like.

As described above, depending on a position of the watch-type terminal in which the optical sensor is installed, there may be a significant difference in the reliability and effectiveness of light exposure information obtained through the watch-type terminal. Accordingly, it is required to develop a watch-type terminal equipped with an optical sensor which is disposed in an optimal position to precisely and reliably ensure the user's light exposure information.

A related art of the present disclosure is disclosed in Korean Unexamined Patent Application Publication No. 10-2015-0079659.

DISCLOSURE

Technical Problem

The present disclosure is provided to solve the problems of the related art and an object of the present disclosure is to provide a watch-type terminal in which an optical sensor is equipped on a side part and the side part equipped with the optical sensor is induced to be worn outwardly toward fingers of the user so that the blocking of the optical sensor by the upper sleeves of the user, and the like is prevented to consistently and accurately acquire illuminance information.

However, objects to be achieved by various embodiments of the present disclosure are not limited to the technical objects as described above and other technical objects may be present.

Technical Solution

As a technical means to achieve the above-described technical object, a watch-type terminal with an optical sensor equipped on a side part according to the exemplary embodiment of the present disclosure may include a body part; a strap unit which fixes the body part to a wrist part of a user; and an optical sensor unit including an optical sensor which is installed on a side surface of the body part and acquires illuminance information.

Further, the watch-type terminal with an optical sensor equipped on a side part according to the exemplary embodiment of the present disclosure may further include a determining unit which determines whether the watch-type terminal is worn such that the side surface on which the optical sensor is disposed is directed to the fingers of the user.

Further, the watch-type terminal with an optical sensor equipped on a side part according to the exemplary embodiment of the present disclosure may further include a display unit which is provided on the body part to display predetermined information; and a control unit which controls an output direction of the predetermined information through the display unit to be a first direction which is a normal output direction corresponding to a user's gaze direction or a second direction in which the predetermined information is output to be symmetrical to the normal output direction, but does not correspond to the gaze direction to be output in an inverted type.

Further, the control unit may control the output direction based on the determination result of the determining unit.

Further, when the determining unit determines that the watch-type terminal is worn such that the side surface is directed to the fingers, the control unit may control the output direction to be the first direction.

Further, when the determining unit determines that the watch-type terminal is not worn such that the side surface is directed to the fingers, the control unit may control the output direction to be the second direction.

Further, the watch-type terminal with an optical sensor equipped on a side part according to the exemplary embodiment of the present disclosure may further include a notification unit which outputs a notification signal including at least one of a sound signal and a vibration signal when the determining unit determines that the watch-type terminal is not worn such that the side surface of the watch-type terminal is directed to the fingers.

Further, the determining unit may determine a blocking degree of the optical sensor.

Further, the control unit may control the optical sensor unit to change the relative position of the optical sensor with respect to the body part, based on the blocking degree.

Further, the notification unit may output the notification signal based on the blocking degree.

Further, the control unit may control a protruding degree of the optical sensor from the body part.

In the meantime, a watch-type terminal with an optical sensor equipped on a side part according to another exemplary embodiment of the present disclosure may include a body part; a strap unit which fixes the body part to a wrist part of a user; and an optical sensor unit including a first optical sensor which is installed on one side surface of the body part and acquires illuminance information and a second optical sensor which is installed on the other side surface of the body part and acquires illuminance information.

Further, the watch-type terminal with an optical sensor equipped on a side part according to another exemplary embodiment of the present disclosure may further include a determining unit which determines any one optical sensor which is directed to the user's fingers as a main optical sensor and the other one optical sensor as a sub optical sensor, based on the wearing direction of the watch-type terminal.

Further, the determining unit may determine the blocking degree of the main optical sensor and the blocking degree may be determined based on a deviation of illuminance information collected from the main optical sensor and illuminance information collected from the sub optical sensor.

Further, the watch-type terminal with an optical sensor equipped on a side part according to another exemplary embodiment of the present disclosure may further include a control unit which controls the optical sensor unit to change a relative position of the main optical sensor with respect to the body part, based on the blocking degree.

The above-described solving means are merely illustrative but should not be construed as limiting the present disclosure. In addition to the above-described embodiments, additional embodiments may be further provided in the drawings and the detailed description of the present disclosure.

Advantageous Effects

According to the above-described solving means of the problem of the present disclosure, provided is a watch-type terminal in which an optical sensor is equipped on a side part and the side part equipped with the optical sensor is induced to be worn outwardly toward fingers of the user so that the blocking of the optical sensor by the upper sleeve of the user, and the like is prevented to consistently and accurately acquire illuminance information.

However, according to the above-described solving means, a watch-type terminal may be provided to display predetermined information in an optimal direction while maintaining the directivity of the optical sensor mounted in the watch-type terminal to be directed to the fingers of the user regardless of the position of the user's hand on which the watch-type terminal is worn, by controlling an output direction of predetermined information which is displayed on a display provided on a watch-type terminal to be switched as needed.

However, the effect which can be achieved by the present disclosure is not limited to the above-described effects, there may be other effects.

BEST MODE

Figure 1:
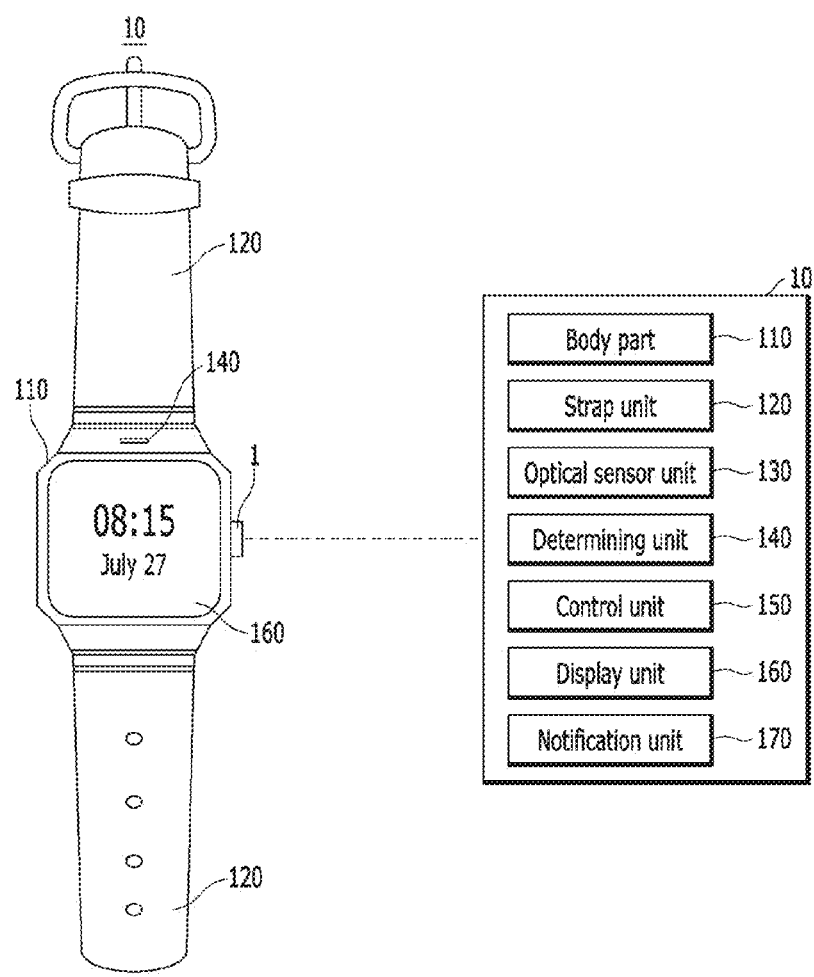
FIG. 1 is a schematic diagram of a watch-type terminal with an optical sensor equipped on a side part according to an exemplary embodiment of the present disclosure.

Hereinafter, the present disclosure will be described more fully hereinafter with reference to the accompanying drawings, in which exemplary embodiments of the present disclosure are shown. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" or "indirectly coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

Throughout the specification of the present disclosure, unless explicitly described to the contrary, when a part "comprises" an element, the word "comprise" and variations such as "comprises" or "comprising", will be understood to imply the inclusion of stated elements but not the exclusion of any other elements.

For reference, in the description of the exemplary embodiment of the present disclosure, terms regarding a direction or a position (a length direction, a width direction, or the like) are described with respect to a placement state of each component illustrated in the drawing. For example, in FIGS. 1 to 7, the length direction may be a direction from 12 o'clock to 6 o'clock, the width direction may be a direction from 3 o'clock to 9 o'clock, and the vertical direction may be the normal direction of the drawing.

However, such a direction setting may vary depending on the placement state of the device of the present disclosure. For example, if necessary, the device of the present disclosure may be disposed such that a reference length direction of FIGS. 1 to 7 is directed to the horizontal direction (a left to right direction) and as another example, the device of the present disclosure may be disposed such that the reference length direction of FIGS. 1 to 7 is directed to an oblique direction.

The present disclosure relates to a watch-type terminal with an optical sensor equipped on a side part.

FIG. 1 is a schematic diagram of a watch-type terminal with an optical sensor equipped on a side part according to an exemplary embodiment of the present disclosure.

Referring to FIG. 1, a watch-type terminal 10 with an optical sensor equipped on a side part according to an exemplary embodiment of the present disclosure (hereinafter, referred to as a "watch-type terminal 10") may include a body part 110, a strap unit 120, an optical sensor unit 130, a determining unit 140, a control unit 150, a display unit 160, and a notification unit 170. Even though it is not illustrated in FIG. 1, the watch-type terminal 10 may include an analysis unit (not illustrated) which analyzes a circadian rhythm of the user by means of illuminance information acquired by the optical sensor 1.

For reference, in the description of the exemplary embodiment of the present disclosure, the term "watch-type terminal" does not limitedly refer only to a device (for example, a watch or a smart watch) which provides time information, such as a date, a day of the week, and a time, to the user (wearer), but is a concept which widely includes wearable devices, such as smart bands, for collecting user's biometric information while being worn on the user's wrist part, according to an implementation example of the present disclosure. In this regard, when the watch-type terminal 10 of the present disclosure is a smart band type, it is advantageous in that a duration of a power supply (battery) is relatively long and it is comfortable to wear, so that the user can wear it for a long time and a wearing state can be maintained while sleeping.

The body part 110 is a component including a main circuit component, such as a processor and a memory, for executing main functions of the watch-type terminal 10 and in the description of the exemplary embodiment of the present disclosure, sub components, such as an optical sensor unit 130, a determining unit 140, a control unit 150, a display unit 160, a notification unit 170, and an analysis unit (not illustrated) of the watch-type terminal 10 may be provided in the body part 110.

The strap unit 120 may be connected to both sides of the body part 110 to fix the body part 110 to a wrist part of the user. Hereinafter, a direction-related term to describe the exemplary embodiment of the present disclosure will be defined with respect to a direction extending the strap unit 120 from the body part 110. Specifically, a "length direction" is a direction that the strap unit 120 extends from the body part 110, that is, corresponds to a reference vertical direction of FIGS. 1 to 7 (a vertical direction of the drawing, a direction from 12 o'clock to 6 o'clock). A "width direction" is a direction perpendicular to the length direction and may correspond to a reference horizontal direction of FIGS. 1 to 7 (a vertical direction of the drawing, a direction from 3 o'clock to 9 o'clock).

The optical sensor unit 130 may include an optical sensor 1 which is installed on a side surface of the body part 110 and acquires illuminance information. Here, the side surface of the body part 110 on which the optical sensor 1 is mounted may refer to one side surface including one end in a width direction or the other end of the width direction with respect to the width direction of the body part 110. Specifically, as illustrated in FIGS. 1 to 5, when the body part 110 is provided in a rectangular shape as a whole, the side part on which the optical sensor 1 is installed may correspond to the right side surface or the left side surface among four sides corresponding to four outer corners of the body part 110. As another example, when the body part 110 is provided in a circular shape as a whole, the side part on which the optical sensor 1 is installed may correspond to an outer side surface of any one area, between two semi-circular areas, divided by bisecting the body part 110 in a width direction.

Further, according to the exemplary embodiment of the present disclosure, the optical sensor unit 130 may include an optical sensor cover (not illustrated) which is installed on a side surface of the body part 110 and is equipped with a convex shape (for example, a hemispherical shape, etc.) so as to enclose the optical sensor 1. At this time, the optical sensor cover (not illustrated) may be provided with a transparent material so as to allow at least a part of light to pass through the optical sensor cover to be incident onto the optical sensor 1 therein.

The determining unit 140 may determine whether the watch-type terminal 10 is worn such that a side surface of the body part 110 on which the optical sensor 1 is disposed is directed to the fingers of the user (that is, a wearer of the watch-type terminal 10).

According to the exemplary embodiment of the present disclosure, the determining unit 140 may operate to sense a body part, such as a hand or a torso in the vicinity of the watch-type terminal 10, based on a proximity sensor (not illustrated) provided in the watch-type terminal and determine a wearing direction of the watch-type terminal 10 based on the sensing result. As another example, the determining unit 140 may operate to determine the wearing direction of the watch-type terminal 10, based on image information of an area in the vicinity of the watch-type terminal 10 which is acquired based on an image sensor (not illustrated) provided in the watch-type terminal 10. As another example, the determining unit 140 may operate to deduce a wearing direction of the watch-type terminal 10 based on previously ensured information about a hand which is mainly used by a user (in other words, whether the user is a right-handed or left-handed person).

The display unit 160 may be provided in the body part 110 to display predetermined information. For example, the display unit 160 may be provided on an upper surface of the body part 110 and display predetermined information in a direction to recognize the predetermined information above the watch-type terminal 10.

The control unit 150 may control an output direction of the predetermined information through the display unit 160 to be a first direction which is a normal output direction corresponding to a user's gaze direction or a second direction which outputs the predetermined information in a direction symmetric to the normal output direction in an inverted state without corresponding to the gaze direction. Further, the control unit 150 may control an output direction of the predetermined information through the display unit 160 based on the determination result of the determining unit 140.

Specifically, according to the exemplary embodiment of the present disclosure, when the determining unit 140 determines that the watch-type terminal 10 is worn such that the side surface of the body part 110 on which the optical sensor 1 is disposed is directed to the fingers of the user, the control unit 150 may control the output direction of the predetermined information through the display unit 160 to be the first direction. In contrast, when the determining unit 140 determines that the watch-type terminal 10 is not worn such that the side surface of the body part 110 on which the optical sensor 1 is disposed is directed to the fingers of the user, the control unit 150 may control the output direction of the predetermined information through the display unit 160 to be the second direction.

Figure 2:
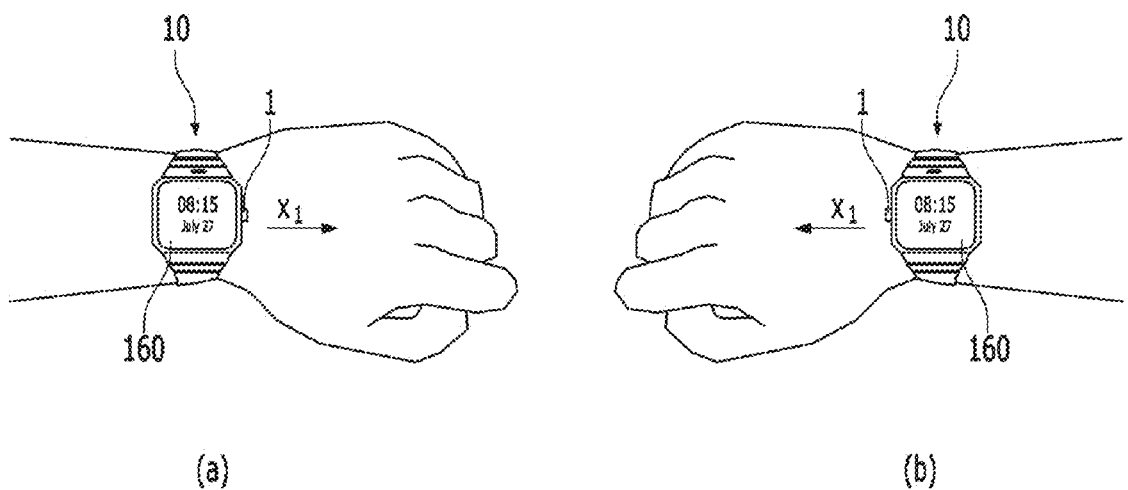
FIG. 2 is a view illustrating an information output direction when a watch-type terminal with an optical sensor equipped on a side part according to an exemplary embodiment of the present disclosure is worn such that the side surface on which the optical sensor is disposed is directed to the fingers of the user.
Figure 3:
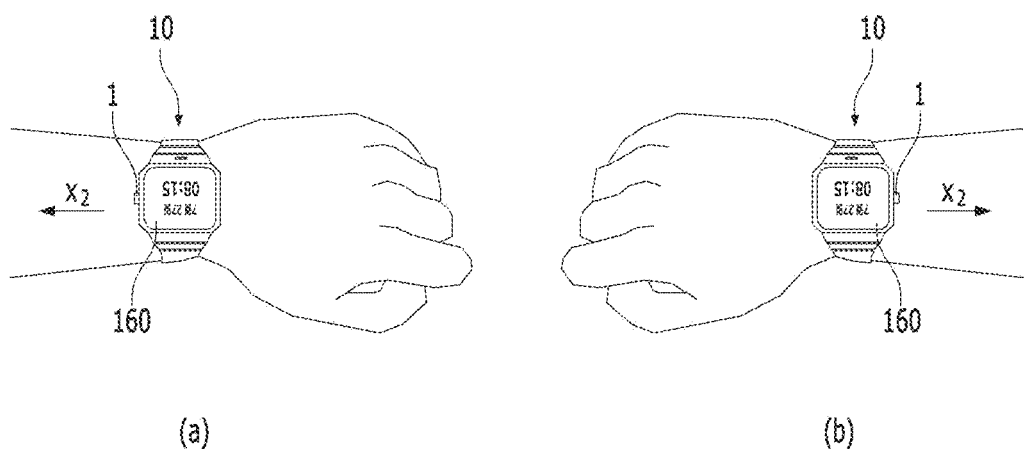
FIG. 3 is a view illustrating an information output direction when a watch-type terminal with an optical sensor equipped on a side part according to an exemplary embodiment of the present disclosure is worn such that the side surface on which the optical sensor is disposed is not directed to the fingers of the user.

FIG. 2 is a view illustrating an information output direction when a watch-type terminal with an optical sensor equipped on a side part according to an exemplary embodiment of the present disclosure is worn such that the side surface on which the optical sensor is disposed is directed to the fingers of the user. FIG. 3 is a view illustrating an information output direction when a watch-type terminal with an optical sensor equipped on a side part according to an exemplary embodiment of the present disclosure is not worn such that the side surface on which the optical sensor is disposed is directed to the fingers of the user.

Specifically, referring to FIG. 2, when the determining unit 140 determines that the watch-type terminal 10 is worn in a direction $x_1$ in which the side surface of the body part 110 is directed to the fingers of the user, the control unit 150 may control the direction in which the predetermined information is displayed through the display unit 160 to be the first direction (in other words, a correct direction) corresponding to the user's gaze direction to allow the user to recognize that the watch-type terminal 10 is worn in a correct direction. For reference, referring to FIGS. 2 and 3, the predetermined information, which is displayed through the display unit 160, for example, includes date information, time information, and the like, but is not limited thereto.

In contrast, referring to FIG. 3, when the determining unit 140 determines that the watch-type terminal 10 is worn in a direction $x_2$ in which the side surface of the body part 110 is not directed to the fingers of the user, the control unit 150 may control the direction in which the predetermined information is displayed through the display unit 160 to be the second direction (in other words, a wrong direction) in which the direction displaying the predetermined information through the display unit 160 does not correspond to the user's gaze direction to be inverted to intuitively recognize that the user wears the watch-type terminal 10 in a wrong direction (that is, the watch-type terminal is worn in a direction in which the optical sensor 1 is not directed to the finger, but is directed to the user's torso so that there is a risk that the optical sensor 1 is covered by the upper sleeve) to indirectly induce the user to wear the watch-type terminal 10 in the correct direction in which the optical sensor 1 is disposed to be directed to the user's fingers.

Further, referring to FIG. 2, as long as the user correctly wears the watch-type terminal so that the optical sensor 1 is disposed outwardly toward the fingers, regardless of the position of the hand (that is, a right hand or a left hand) on which the watch-type terminal 10 is worn, the control unit 150 may control the displaying direction of the predetermined information through the display unit 160 to be the first direction which is a correct direction corresponding to the user's gaze direction so that the user may be provided with the predetermined information without causing any inconvenience even if the user wears the watch-type terminal 10 on either the right hand or the left hand.

Similarly, referring to FIG. 3, if the user incorrectly wears the watch-type terminal 10 so that the optical sensor 1 is disposed in an opposite direction which is not directed to the fingers, regardless of the position of the hand (that is, a right hand or a left hand) on which the watch-type terminal 10 is worn by the user, the control unit 150 may control the displaying direction of the predetermined information through the display unit 160 to be the second direction which is a wrong direction which does not correspond to the user's gaze direction. Accordingly, the optical sensor 1 may be induced to be directed to a direction that the optical sensor 1 is not covered by the upper sleeve even if the user wears the watch-type terminal 10 on either the right hand or the left hand.

In summary, the control unit 150 may switch (in other words, rotates at 180 degrees) the output direction of the predetermined information displayed through the display unit 160 with respect to the length direction if necessary. For better understanding, in part (a) of FIG. 2 and part (b) of FIG. 2, the output directions of the predetermined information are opposite directions which rotate at 180 degrees with respect to the length direction and in part (a) of FIG. 3 and part (b) of FIG. 3, the output directions of the predetermined information are also opposite directions which rotate at 180 degrees with respect to the length direction.

If the determining unit determines that the watch-type terminal 10 is not worn such that the side surface of the body part 110 on which the optical sensor 1 is disposed is directed to the user's finger, the notification unit 170 may output a notification signal including at least one of a sound signal and a vibration signal. For example, the notification unit 170 may output a voice or text type guide signal informing that the wearing direction of the watch-type terminal 10 is not correct as a notification signal.

Hereinafter, an operation of a watch-type terminal 10 corresponding to a case in which the process of acquiring the illuminance information by the optical sensor 1 is not normally performed such as when the optical sensor 1 is covered by the upper sleeve, will be described with reference to FIGS. 4 and 5.

Figure 4:
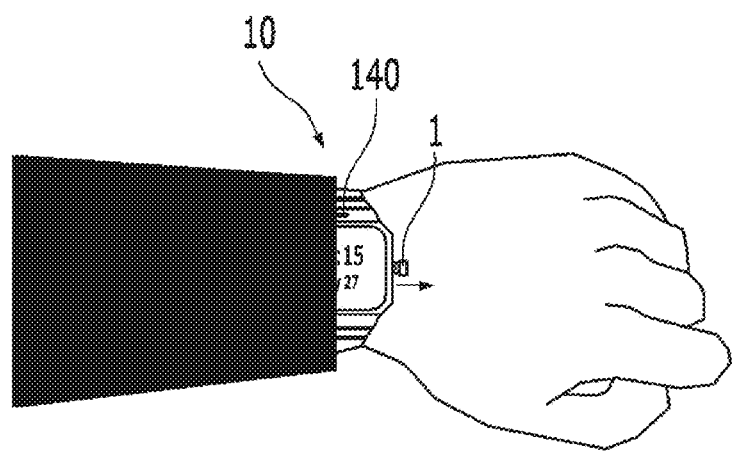
FIGS. 4 and 5 are views illustrating that a relative position of the optical sensor with respect to a body part is changed based on a blocking degree of the optical sensor.
Figure 5:
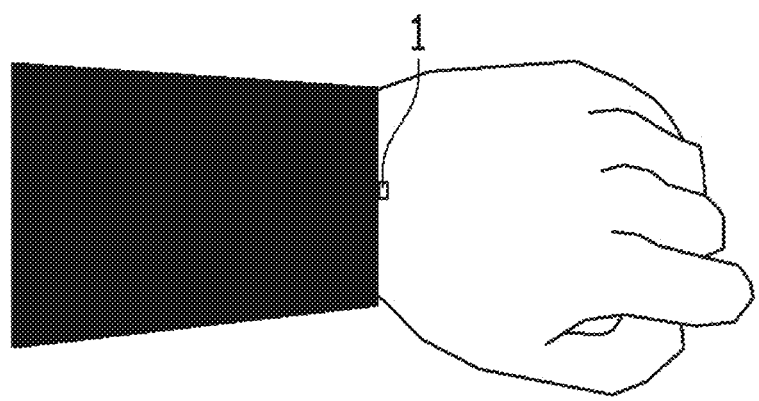

FIGS. 4 and 5 are views illustrating that a relative position of the optical sensor with respect to a body part is changed based on a blocking degree of the optical sensor.

Referring to FIGS. 4 and 5, the determining unit 140 may determine a blocking degree of the optical sensor 1. Further, the control unit 150 may control the optical sensor unit 130 to change the relative position of the optical sensor 1 with respect to the body part 110, based on the blocking degree determined by the determining unit 140.

Specifically, according to the exemplary embodiment of the present disclosure, the control unit 150 may control a protruding degree of the optical sensor 1 from the body part 110. In this regard, referring to FIG. 4, as a determination result of the determining unit 140, if it is determined that the optical sensor 1 is directly blocked by the upper sleeve or even though the optical sensor 1 is not directly blocked, the body part 110 in an area adjacent to the area in which the optical sensor 1 is disposed is blocked by the upper sleeve, and the like by a predetermined level or more so that if it is determined that there is at least some possibility that the optical sensor 1 cannot normally acquire illuminance information according to the user's movement, the control unit 150 may control the optical sensor 1 to protrude to the user's finger outwardly from the normal state in which the blocking situation does not occur. Further, referring to FIG. 5, even though the optical sensor 1 at least partially protrudes outwardly so that even though a partial area of the body part 110 of the user is blocked by the upper sleeve and the like, the protruding optical sensor 1 may be out of the area covered by the upper sleeve to normally acquire illuminance information.

Further, according to the exemplary embodiment of the present disclosure, the control unit 150 may control the optical sensor unit 130 to vary a relative position of the optical sensor 1 in the side part of the body part 110 in which the optical sensor 1 is disposed. For example, the control unit 150 may control the optical sensor unit 130 to move the optical sensor 1 toward an area predicted that the blocking level is lower than that of the other area in the side part of the body part 110 in which the optical sensor 1 is disposed, based on the blocking degree determined by the determining unit 140.

Specifically, a method of relatively moving the optical sensor 1 in the side part may vary based on the shape of the body part 110. For example, as illustrated in FIGS. 1 to 4, in the case of the watch-type terminal 10 including a quadrangular body part 110 as a whole, the optical sensor 1 may be controlled to slidably move along the length direction by the control unit 150 in the side part (in other words, a right surface in FIG. 1) in which the optical sensor 1 is disposed, among four side parts. As another example, in the case of the watch-type terminal 10 including a circular body part 110 as a whole, when an area divided so as to correspond to a direction directed to the user's finger, between two areas obtained by dissecting the circular body part 110 with respect to the width direction, is a side part in which the optical sensor 1 is disposed, the optical sensor 1 may be controlled by the control unit 150 to slidably move along a clockwise direction or a counterclockwise direction in the side part.

Further, according to the exemplary embodiment of the present disclosure, a method of controlling the optical sensor 1 to change the relative position with respect to the body part 110 may include a hybrid method applying both a first method of controlling a protruding degree from the body part 110 and a second method of slidably moving the optical sensor 1 in the side part in which the optical sensor 1 is disposed, which are described above according to an implementation example of the present disclosure.

According to the exemplary embodiment of the present disclosure, the determining unit 140 may determine a blocking degree based on a change of illuminance information acquired by the optical sensor 1 over time. Specifically, when the determining unit 140 determines that the illuminance information is irregularly changed to a predetermined threshold level or higher based on the changing degree of the illuminance information acquired by the optical sensor 1 over time (for example, a differential value of the illuminance information over time, gradient information of a illuminance information graph, and the like), the determining unit may determine that the optical sensor 1 is blocked by the upper sleeve of the user, and the like. As another example, the determining unit 140 may operate to sense an upper sleeve, and the like in the vicinity of the watch-type terminal 10 based on the proximity sensor (not illustrated) equipped in the watch-type terminal 10 and determine the blocking degree based on the sensing result. As still another example, the determining unit 140 may operate to determine the blocking degree by determining whether there is an object which interrupts the acquisition of the illuminance information of the optical sensor 1, such as a sleeve, based on image information of a surrounding area of the watch-type terminal 10 acquired based on an image sensor (not illustrated) equipped in the watch-type terminal 10.

Further, the notification unit 170 may output a notification signal based on the blocking degree determined by the determining unit 140.

According to the exemplary embodiment of the present disclosure, the notification unit 170 may output a notification signal based on the blocking degree, by a user terminal (not illustrated) previously associated with the watch-type terminal 10. For example, the notification signal based on the blocking degree output through the user terminal (not illustrated) or the watch-type terminal 10 may include a voice or text type guide signal including a phrase informing that it is determined that the optical sensor 1 of the watch-type terminal 10 is blocked by the upper sleeve, and the like and thus the illuminance information is not normally acquired, a predetermined vibration-based warning signal, a predetermined sound-based warning signal, and the like.

The watch-type terminals 10 and 20 and the user terminal (not illustrated) may communicate with each other via a network. The network means a connection structure which allows information exchange between nodes such as terminals or servers and examples of the network include $3^{rd}$ generation partnership project (3GPP) network, a long term evolution network (LTE), a 5G network, a world interoperability for microwave access (WIMAX) network, Internet, a local area network (LAN), wireless local area network (Wireless LAN), wide area network (WAN), a personal area network (PAN), a Wi-Fi network, a Bluetooth network, a satellite broadcasting network, an analog broadcasting network, a digital multimedia broadcasting (DMB) network, and the like, but are not limited thereto.

For example, the user terminal (not illustrated) may include all kinds of wireless communication devices such as a smart phone, a smart pad, a tablet PC, a personal communication system (PCS), a global system for mobile communication (GSM), a personal digital cellular (PDC), a personal handyphone system (PHS), a personal digital assistant (PDA), an international mobile telecommunication (IMT)-2000, code division multiple access (CDMA)-2000, W-code division multiple access (W-CDMA), and a wireless broadband internet (Wibro) terminal.

Further, according to the exemplary embodiment of the present disclosure, the optical sensor unit 130 may include a storage module (not illustrated) which stores illuminance information acquired by the optical sensor 1. Further, the storage module (not illustrated) of the optical sensor unit 130 may time-sequentially stores the illuminance information which is consistently collected along the lapse of time and collect the illuminance information by matching reliability information of the illuminance information collected at a predetermined timing based on the blocking degree determined by the determining unit 140.

For example, the reliability for illuminance information collected at a timing when the determining unit 140 determines that the blocking degree exceeds a predetermined level is evaluated to be low and the reliability for illuminance information collected at a timing when the determining unit 140 determines that the blocking degree is a predetermined level or lower is evaluated to be high to be collected. Accordingly, when the analysis of the circadian rhythm of the user is performed by the watch-type terminal 10 or a user terminal (not illustrated) previously associated with the watch-type terminal 10 by utilizing the illuminance information, only illuminance information matching a predetermined threshold level or higher of reliability is utilized and illuminance information to which a predetermined threshold level or lower of reliability is assigned is excluded to perform the analysis of the user's circadian rhythm so that the circadian rhythm analysis for the user may be more accurately performed.

Further, according to the exemplary embodiment of the present disclosure, the watch-type terminal 10 may include an analysis unit (not illustrated) which analyzes the user's circadian rhythm by utilizing the time-series illuminance information stored in the storage module (not illustrated) of the optical sensor unit 130. According to the exemplary embodiment of the present disclosure, the analysis unit (not illustrated) may divide and collect the illuminance information stored in the storage module (not illustrated) by each of a plurality of time lines which has been divided in advance. To be more specific, the plurality of time lines may be obtained by dividing one day into a daytime (12 hours) and a bedtime (12 hours) or dividing one day into three time slots by 8 hours based on a sunrise time or a sunset time, but is not limited thereto. Further, the analysis unit (not illustrated) may operate to calculate a light exposure-related health index of the user based on the illuminance information collected for every time lines.

With regard to the light exposure-related health index of the user deduced from the illuminance information, light is the most important factor to synchronize circadian rhythms of not only human, but also all the living things. Accordingly, the analysis unit (not illustrated) may evaluate the light exposure-related health index to be excellent as the amount of daytime light exposure, which is the sum of the illuminance information collected during the daytime, becomes large and evaluate the light exposure-related health index not to be excellent as the amount of nighttime light exposure which is the sum of the illuminance information collected during the nighttime becomes large.

Further, according to the exemplary embodiment of the present disclosure, when a period (for example, a second period) having reliability information which is lower than a threshold level, between two periods (for example, a first period and a third period) in which the reliability information is equal to or higher than the threshold level is maintained within a predetermined threshold time, based on the reliability information for every timing of the illuminance information determined by the determining unit 140, the analysis unit (not illustrated) may operate to update illuminance information corresponding to the second period based on the illuminance information collected for the first period and the illuminance information collected for the third period. According to the exemplary embodiment of the present disclosure, the updating method of the illuminance information may include a method of calculating an average about illuminance information collected for two normal periods or a method of applying linear interpolation, but is not limited thereto.

Hereinafter, a structure and a function of a watch-type terminal 20 including an optical sensor equipped on a side part according to another exemplary embodiment of the present disclosure (hereinafter, referred to as a "watch-type terminal 20") will be described with reference to FIGS. 6 and 7. The description of the watch-type terminal 10 according to the exemplary embodiment of the present disclosure which has been described until now may be correspondingly applied to the description of the watch-type terminal 20 according to another exemplary embodiment of the present disclosure to be described below. Therefore, hereinafter, even if omitted, the above-description of the watch-type terminal 10 according to the exemplary embodiment of the present disclosure described above may be applied to the watch-type terminal 20 according to another exemplary embodiment of the present description in the same manner.

Figure 6:
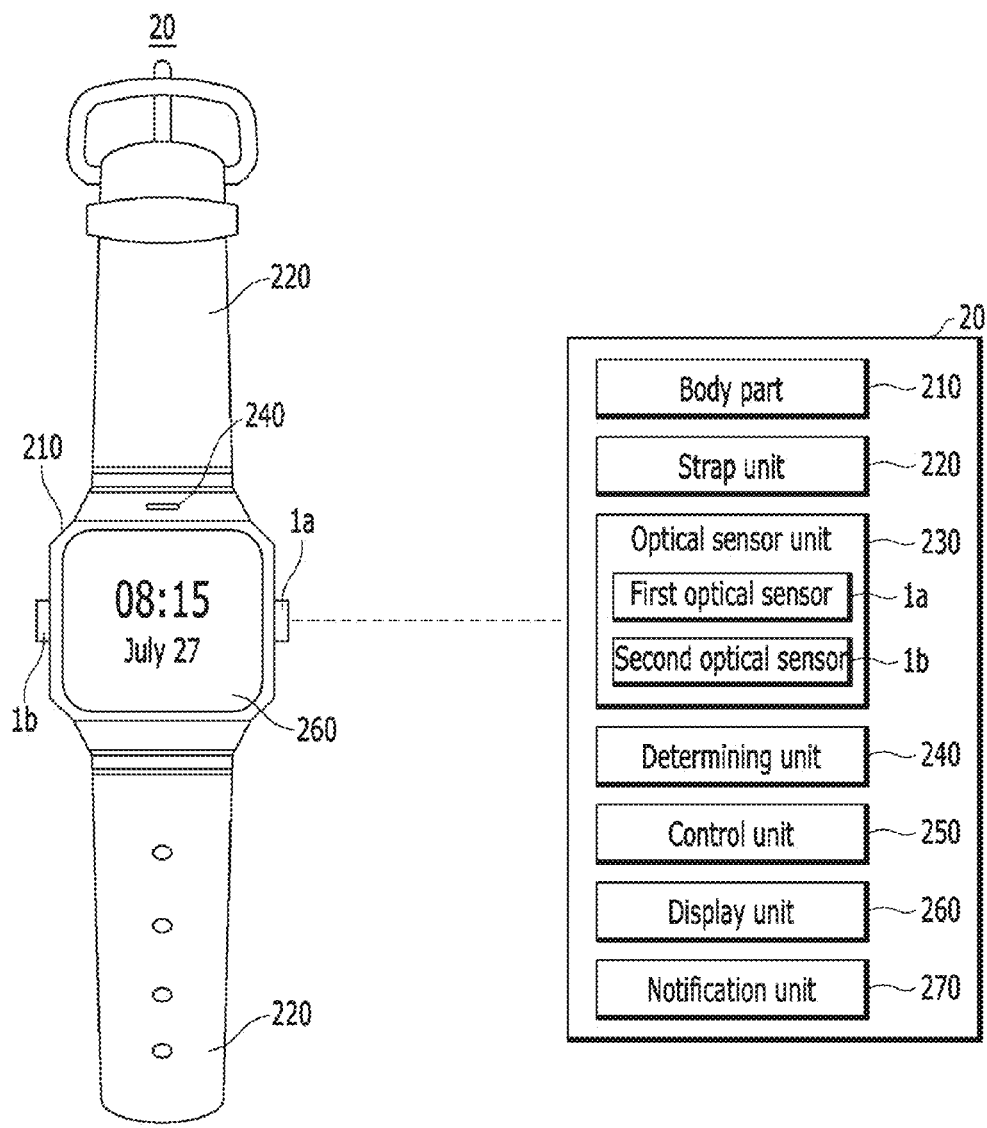
FIG. 6 is a schematic diagram of a watch-type terminal with an optical sensor equipped on a side part according to another exemplary embodiment of the present disclosure.

FIG. 6 is a schematic diagram of a watch-type terminal with an optical sensor equipped on a side part according to another exemplary embodiment of the present disclosure.

Referring to FIG. 6, the watch-type terminal 20 may include a body part 210, a strap unit 220, an optical sensor unit 230, a determining unit 240, a control unit 250, a display unit 260, and a notification unit 270. Further, referring to FIG. 6, the optical sensor unit 230 of the watch-type terminal 20 may include a first optical sensor 1a and a second optical sensor 1b.

Specifically, the optical sensor unit 230 may include the first optical sensor 1a which is installed on one side surface of the body part 210 to acquire illuminance information and the second optical sensor 1b which is installed on the other side surface of the body part 210 to acquire illuminance information.

The determining unit 240 may determine any one optical sensor which is directed to the fingers of the user, between the first optical sensor 1a and the second optical sensor 1b, as a main optical sensor, and determine the other optical sensor as a sub optical sensor, based on a wearing direction of the watch-type terminal 20.

Figure 7:
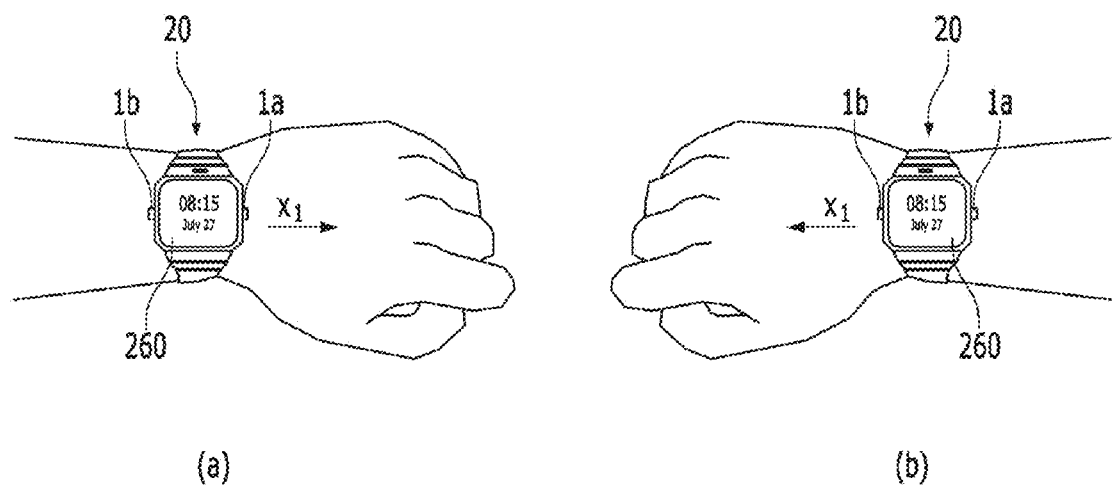
FIG. 7 is a view for explaining that a main optical sensor and a sub optical sensor are determined depending on a position of the user's hand on which a watch-type terminal with an optical sensor equipped on a side part according to another exemplary embodiment of the present disclosure is worn.

FIG. 7 is a view for explaining that a main optical sensor and a sub optical sensor are determined depending on a position of the user's hand on which a watch-type terminal with an optical sensor equipped on a side part according to another exemplary embodiment of the present disclosure is worn.

Referring to FIG. 7, part (a) of FIG. 7 illustrates that the watch-type terminal 20 is worn on a left hand of the user and at this time, the first optical sensor 1a of the watch-type terminal 20 may be determined as a main optical sensor corresponding to a direction $x_1$ directed to the left fingers of the user and the second optical sensor 1b located at the opposite side may be determined as a sub optical sensor. Further, part (b) of FIG. 7 illustrates that the watch-type terminal 20 is worn on a right hand of the user and at this time, the second optical sensor 1b of the watch-type terminal 20 may be determined as a main optical sensor corresponding to a direction $x_1$ directed to the right fingers of the user and the first optical sensor 1a located at the opposite side may be determined as a sub optical sensor.

According to another exemplary embodiment of the present disclosure, after determining the main optical sensor and the sub optical sensor between the first optical sensor 1a and the second optical sensor 1b, the control unit 250 may control the main optical sensor to collect illuminance information and control the sub optical sensor so as not to collect the illuminance information. As another example, after determining the main optical sensor and the sub optical sensor between the first optical sensor 1a and the second optical sensor 1b, the control unit 250 may control both the main optical sensor and the sub optical sensor to collect the illuminance information. However, the illuminance information acquired by the main optical sensor and the sub optical sensor may be distinguished. In this regard, deviation information of the illuminance information acquired by the main optical sensor and the illuminance information acquired by the sub optical sensor may be utilized to determine the blocking degree of the body part 210 or the main optical sensor or verify the reliability about the collected illuminance information.

Further, according to another exemplary embodiment of the present disclosure, the control unit 250 may control both the main optical sensor and the sub optical sensor to collect the illuminance information or control only the main optical sensor to collect the illuminance information, based on residual battery information of the watch-type terminal 20. For example, when the residual battery of the watch-type terminal 20 is equal to or higher than a threshold level, both the main optical sensor and the sub optical sensor are utilized to collect the illuminance information. In contrast, when the residual battery of the watch-type terminal 20 is lower than a threshold level, only the main optical sensor is utilized to collect the illuminance information.

Further, the determining unit 240 may determine the blocking degree of the main optical sensor 1a or 1b. According to another exemplary embodiment of the present disclosure, the blocking degree of the main optical sensor may be determined based on a deviation of illuminance information collected from any one optical sensor 1a or 1b which is determined as a main optical sensor and illuminance information collected from any one optical sensor 1a or 1b which is determined as a sub optical sensor.

Further, the control unit 250 may control the optical sensor unit 230 to change the relative position of the main optical sensor with respect to the body part 210, based on the blocking degree acquired by the determining unit 240. For example, when the determining unit 240 determines that the blocking degree of the main optical sensor exceeds a predetermined level, the control unit 250 may control the main optical sensor to protrude from the body part 210 or control the main optical sensor to slidably move in the side part of the body part 210 in which the optical sensor is installed.

The above-description of the present disclosure is illustrative only and it is understood by those skilled in the art that the present disclosure may be easily modified to another specific type without changing the technical spirit of an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

The invention claimed is:

1. A wearable device with an optical sensor equipped on a side part, comprising:
   a body part;
   a strap unit to fix the body part to a wrist part of a user;
   an optical sensor unit including the optical sensor installed on a side surface of the body part, wherein the optical sensor unit is to acquire illuminance information;
   a determining unit to determine whether the wearable device is worn such that the side surface on which the optical sensor is disposed is directed to fingers of the user;
   a display unit which is provided on the body part to display predetermined information; and
   a control unit to control an output direction of the predetermined information through the display unit to be a normal output direction corresponding to a user's gaze direction when the side surface on which the optical sensor is disposed is directed toward the fingers of the user and to control the output direction of the predetermined information through the display unit to be an abnormal output direction which does not correspond to the user's gaze direction when the side surface on which the optical sensor is disposed is directed away from the fingers of the user.

2. The wearable device of claim 1, further comprising a notification unit to output a notification signal including a sound signal or a vibration signal when the determining unit determines that the side surface on which the optical sensor is disposed is not directed toward the fingers.

3. The wearable device of claim 2, wherein the determining unit further determines a blocking degree of the optical sensor and the control unit controls the optical sensor unit to change a relative position of the optical sensor with respect to the body part based on the blocking degree.

4. The wearable device of claim 3, wherein the notification unit outputs the notification signal based on the blocking degree.

5. The wearable device of claim 3, wherein the control unit controls a protruding degree of the optical sensor from the body part.

6. A wearable device with an optical sensor equipped on a side part, comprising:
   a body part;
   a strap unit to fix the body part to a wrist part of a user;
   an optical sensor unit including a first optical sensor installed on one side surface of the body part to acquire first illuminance information and a second optical sensor installed on another side surface of the body part to acquire second illuminance information;
   a determining unit to determine which one of the first optical sensor and the second optical sensor is directed to a user's fingers and to assign the one as a main optical sensor and a remaining one as a sub optical sensor, wherein the determining unit further determines a blocking degree of the main optical sensor based on a deviation of main illuminance information collected from the main optical sensor and sub illuminance information collected from the sub optical sensor; and
   a control unit to control the optical sensor unit to change a relative position of the main optical sensor with respect to the body part based on the blocking degree.

* * * * *